Patented Sept. 29, 1931

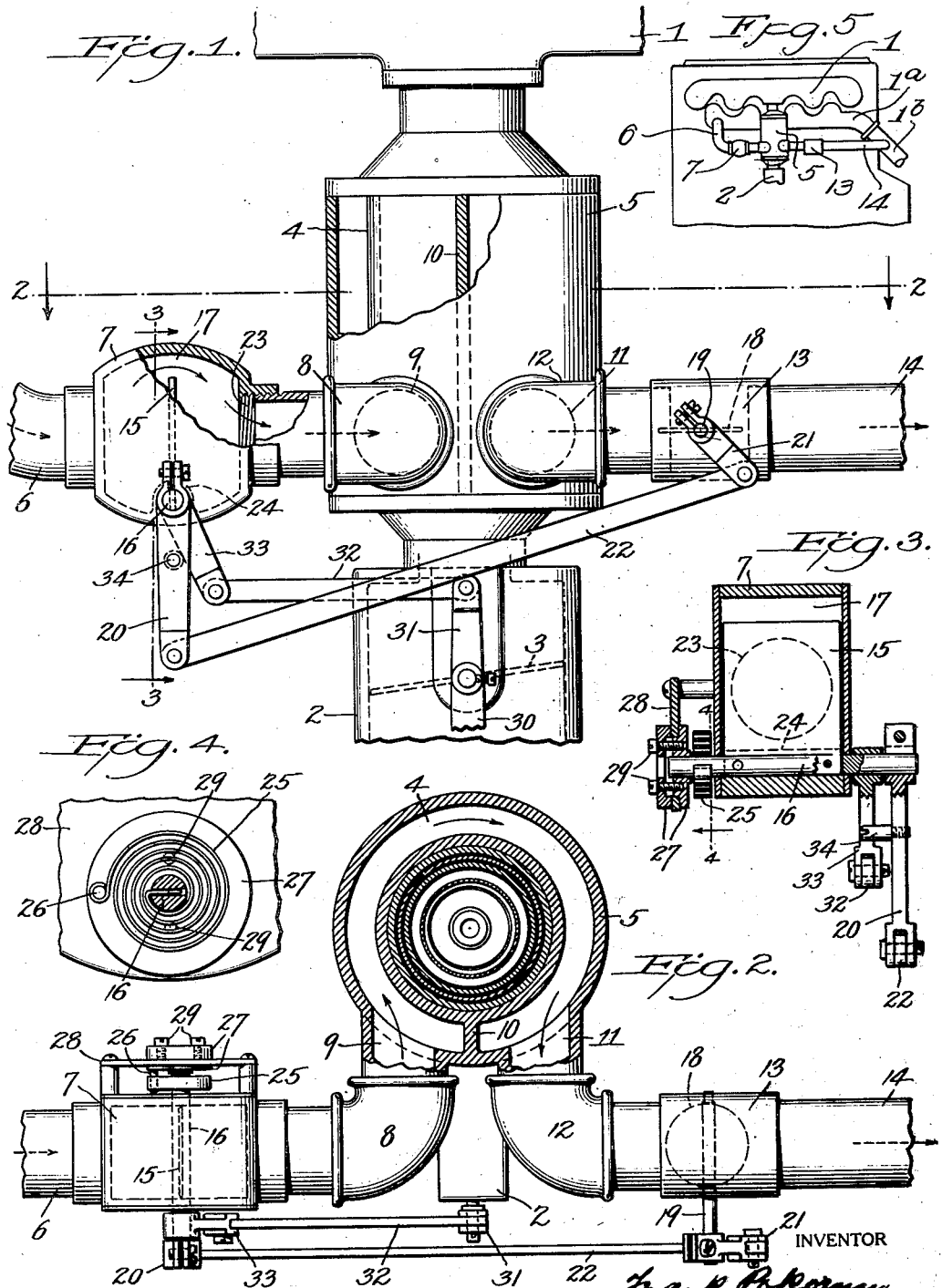

1,824,926

UNITED STATES PATENT OFFICE

FRANK POKORNY, OF MAMARONECK, NEW YORK

CONTROL MEANS FOR HEATING FUEL MIXTURES SUPPLIED TO INTERNAL COMBUSTION ENGINES

Application filed October 10, 1924. Serial No. 742,763.

This invention relates to internal combustion engines, and my improvements are directed to means for regulating the temperature of the liquid fuel and air mixtures passing from the carburetor to the intake manifold of an engine, in order that at relatively low engine speeds, when atomization is imperfect, the fuel may become vaporized in transit in the presence of heat, and that at relatively high engine speeds, when the velocity of mixture flow permits fuel pulverizing effects to be obtained, the heat application is either modified or entirely eliminated. Briefly expressed my invention consists in placing a jacket about the passage or a portion of the passage which communicates between the carburetor and the intake manifold, and in the provision of controlled means for passing a portion of the hot exhaust gases between said jacket and passage.

The jacket is normally open to permit the exhaust to freely pass around the fuel mixture passage, thereby heating up the fuel mixture to render it more readily combustible while the motor is cool, as at starting up, but I provide a control valve which is adapted to shut off the supply of exhaust gases from the jacket as the engine speeds up and thereby increases the flow velocity and hence the pressure developed by the exhaust. To this end I cause the control valve to be carried or influenced by a spring whose tension will hold the valve open against the pressure developed by the flow of exhaust gases, but which spring, having the nature of a thermostat, gradually expands under the influence of the heat to which it is subjected as the hot exhaust passes, and becomes weakened to a degree that enables the pressure of the exhaust stream to close the valve, thus shutting off further supply of exhaust gases to the jacket.

In addition to the automatic means noted for operating the valve that controls the supply of exhaust heat to the fuel mixture passage, my invention further includes the use of positively operating means, co-active with the throttle valve, and functioning to actuate the control valve so that the latter will close with the opening of the throttle valve and open with the closing of the throttle valve.

Other features and advantages of my invention will hereinafter appear.

In the drawings:—

Figure 1 is a side elevation, partly in section, of my improved apparatus for applying under control the heat of exhaust gases to the fuel mixture passage of an internal combustion engine.

Fig. 2 is a plan view taken on the line 2—2 of Figure 1.

Fig. 3 is a section on the line 3—3 of Figure 1, and

Fig. 4 is an enlarged section on the line 4—4 of Fig. 3.

Fig. 5 is an elevation, somewhat diagrammatic of an internal combustion engine with my apparatus applied thereto.

While in the accompanying drawings my invention is shown as operatively arranged with relation to an internal combustion engine, only such parts of an engine are depicted as will suffice to permit the nature and operation of my improvements to be explained.

Thus, at 1 I have shown a portion of an intake manifold and at 2 a portion of a carburetor or duct leading therefrom to the intake manifold, the portion 2 containing the throttle valve 3, and tubular section 4 forming a portion of the passage for fuel mixture between the carburetor and intake manifold.

The passage portion 4 is shown in Fig. 2 as representing the structure comprised in my Reissue Patent No. 15,926, dated October 7, 1924, although my present invention may also be employed independently of said patented structure. Therefore the portion 4 will hereinafter be referred to as the fuel mixture passage.

The fuel mixture passage 4 is surrounded in spaced relation, by a jacket 5. It is my purpose to supply some of the hot exhaust products from the engine to the space between jacket 5 and passage 4. In the example indicated the exhaust manifold 1a is tapped by a pipe 6, which communicates with a valve chamber 7, that leads by means of an elbow 8 to an opening 9 providing therefor in the packet 5. A wall or web 10 divides the passage 4 from jacket 5, thereby causing the exhaust gases to pass in one direction around passage 4; and an outlet 11 in jacket 5 communicates with an elbow 12, which connects, by a valve chamber 13, with a pipe 14 that communicates with the exhaust pipe 1b, to complete the by-pass.

Contained within valve chamber 7 is a flap valve 15, which is carried by a shaft 16 that is journalled in opposite walls of said chamber, near its base, the shaft extending across the chamber with its ends projecting beyond the walls thereof. Said valve 15 is normally extended vertically within the chamber 7, a clearance 17 being left between its upper edge and the top of the chamber, thus permitting exhaust gases to pass through the valve chamber into the jacketed space surrounding the fuel mixture passage 4. The valve chamber 13 also contains a valve, here shown in the form of a butterfly valve 18, carried by a shaft 19, and normally held in the open position, to permit outflow of the exhaust gases being by-passed. The shafts 16 and 19 of the respective valves are connected together by means of arms 20, 21 and a link 22, so that the valve movements to and from the closed and open positions may be synchronous.

The closing movement of valve 15, which is effected by pressure of the exhaust gases flowing in the direction of the arrows (see Fig. 1) causes said valve to close the exit opening 23 of the valve chamber, the heel of the valve at the same time meeting a fixed stop 24.

The function of the valve 18, when closed, is to prevent hot gases from the exhaust pipe entering the space between jacket 5 and passage 4 under back pressure when the valve 15 is closed.

Valve 15 is normally held in its vertical position by means of a spring 25, which is fixed at one end to the shaft 16, outside chamber 7, and at its other end is fixed by means of a stud 26 to a bi-part ring 27, that is revolubly adjustable in a frame 28, said frame being here shown as attached to the side of valve chamber 7.

The screws 29 clamp the elements of bi-part ring 27 to the frame, and are to be loosened to permit rotation of said ring to vary the tension of the spring.

The material of which spring 25 is composed may have a certain co-efficient of expansion to the end that under the temperature condition established in the walls of valve chamber 7 by the passing of the exhaust gases therethrough, said spring, lying just outside said chamber, and becoming expanded by the heat, and consequently weakened in its tension, will respond more readily to the pressure of the exhaust gases impinging upon valve 15, thus permitting said valve to move toward its closed position. It will be appreciated that this closing action of the valve becomes more positive as the engine speeds up, because the flow velocity of the exhaust gases, and consequently the pressure exerted, are thereby increased.

My purpose, therefore, with this device, is to provide means whereby the exhaust heat is employed to heat up the fuel mixture passing to the intake manifold when starting up the engine, to assure vaporization of the fuel, since with the low vacuum available when the engine is turning over slowly fuel atomization is imperfect. But when the engine has speeded up and fuel mixture is aspirated under the influence of a high vacuum, and atomization may be effected as by the means disclosed in my Re-issue Patents Numbers 15,492, 15,493 and 15,494 dated November 21, 1922. Then, raising the temperature of the fuel mixture passing into the intake manifold becomes not only unnecessary but is disadvantageous, as thereby the weight of the charge would be reduced.

In addition to the automatic means described for the control of valve 15 I have found it desirable to provide other, independent control means, co-active with the operation of the throttle valve, to shut off the application of exhaust heat to the fuel mixture passage 4. For instance, it may be assumed an engine has been running for a sufficient time to heat up the cylinders, and then to have been stopped long enough for the valve chamber 7 to cool down, and the spring 25 to have contracted sufficiently to restore valve 15 to an open position. Under these conditions the valve 15 should be movable to its closed position in synchronism with the opening movement of throttle valve 3. Therefore the throttle lever 30 is provided with an extension 31, that connects by a link 32 with an arm 33 which loosely engages the valve shaft 16. A stud 34, carried by the arm 20 that actuates valve 15, lies in the path of arm 33, to be engaged by said arm as the latter is moved by link 32 and extension 31 in the opening operation of the throttle, thereby moving valve 15 toward its closed position.

It is apparent that spring 25 will restore valve 15 to its normal, open position as the throttle valve is moved to its closed position.

Variations within the spirit and scope of my invention are equally comprehended by the foregoing disclosure.

I claim:

1. The combination, in an internal combustion engine, having a fuel mixture supply passage-way, of separate by-pass pipes for leading hot gases from the engine exhaust respectively to and away from contact with said supply passage-way, respective control means for said separate pipes, and connecting means between said respective control means causing the latter to both close and open in unison.

2. The combination, in an internal combustion engine, having an exhaust pipe and a fuel mixture supply passage-way, of a jacket surrounding said passage-way, in spaced relation thereto, by-pass means from said pipe in communication with said jacket, a valve chamber in said by-pass means, a normally open inlet valve for said chamber, said valve being responsive to the flow pressure of the exhaust gases, as their velocity increases, to arrest the flow of said gases to said jacket, other by-pass means leading from said jacket to said exhaust pipe, a valve chamber therein, and an exit valve in said latter chamber to prevent back pressure gases from entering said chamber.

Executed this 2nd day of October, 1924.

FRANK POKORNY.